United States Patent

Mangold et al.

[11] Patent Number: 6,063,354
[45] Date of Patent: *May 16, 2000

[54] PYROGENIC OXIDES AND A PROCESS FOR THEIR PREPARATION

[75] Inventors: Helmut Mangold, Rodenbach, Germany; Peer Plambeck-Fischer; Ingo Pauli, both of Mobile, Ala.; Karlheinz Janzon, Gelnhausen, Germany

[73] Assignee: Degussa Aktiengesellschaft, Frankfurt, Germany

[ * ] Notice: This patent is subject to a terminal disclaimer.

[21] Appl. No.: 09/009,254

[22] Filed: Jan. 20, 1998

Related U.S. Application Data

[63] Continuation-in-part of application No. 60/035,886, Jan. 23, 1997.

[51] Int. Cl.⁷ .................................................. C04B 33/12
[52] U.S. Cl. ............................................................ 423/336
[58] Field of Search .............................................. 423/336

[56] References Cited

U.S. PATENT DOCUMENTS

| | | | |
|---|---|---|---|
| 4,108,964 | 8/1978 | Kratel et al. | 423/336 |
| 4,503,092 | 3/1985 | Klebe et al. | 423/335 |

FOREIGN PATENT DOCUMENTS

| | | |
|---|---|---|
| 900574 | 12/1953 | Germany . |
| 2132428 | 1/1972 | Germany . |
| 2153671 | 5/1973 | Germany . |
| 3045190A1 | 6/1982 | Germany . |
| 195 30 339 | 2/1997 | Germany . |
| 59-169922 | 9/1984 | Japan . |
| 95/29872 | 11/1985 | WIPO . |

OTHER PUBLICATIONS

Aerosil, Herstellung, Eigenshaften und Verhalten in organischen Flussigkeiten Angew Chem 72 (1960) p 744–750, Wagner et al.

Ulmanns Enzyklopädieder Technischen Chemie 4 Aufl Bd 21 p 464–472 No Date available.

*Primary Examiner*—Paul Marcantoni
*Attorney, Agent, or Firm*—Smith Gambrell & Russell, LLP

[57] ABSTRACT

Pyrogenic oxides having a BET surface area of between 30 and 150 $m^2/g$ have a viscosity of less than 2,500 mPas in an aqueous suspension. They are prepared by setting the hydrogen ratio gamma and the oxygen ratio lambda to less than one in a high-temperature flame hydrolysis. The pyrogenic oxides are employed in the CMP application in the electronics industry.

7 Claims, 4 Drawing Sheets

PYROGENIC OXIDES AND A PROCESS FOR THEIR PREPARATION

REFERENCE TO A RELATED APPLICATION

This application is a continuation-in-part of provisional application No. 60/035,886 filed Jan. 23, 1997 which is relied on and incorporated herein by reference.

INTRODUCTION AND BACKGROUND

The present invention relates to pyrogenic oxides and a process for their preparation and to their use as polishing agents.

It is known to prepare pyrogenic silicon dioxide and also other metal- or metalloid oxides by means of high-temperature flame hydrolysis; see Ullmann's *Encyclopedia of Industrial Chemistry*, 4th edition, volume 21 pages 464 et seq.

In the known process, metal and/or metalloid halide compounds, such as, for example, silicon halide compounds or organosilicon halide compounds, are mixed and burned together with atmospheric oxygen and hydrogen in a burner of known design. The pyrogenic silica formed is then separated off from the gases containing hydrogen chloride, and any chloride still adhering to the oxide is removed by treatment with air containing water vapor.

The known oxides, however, exhibit the disadvantage that their polishing performance is too low when used for CMP polishing.

There is therefore an object of the present invention to avoid the problems of the prior art and to develop a pyrogenically prepared oxide having an improved polishing performance.

SUMMARY OF THE INVENTION

The above and other objects of the present invention are achieved by a process for the preparation of pyrogenic oxides by the high-temperature flame hydrolysis process, which controls the hydrogen ratio, gamma, (of the raw material gas mixture in the central tube of the flame hydrolysis reactor) during the preparation of the pyrogenic oxide so that it is less than 1, and in particular preferably between 0.7 and 0.9. The oxygen ratio, lambda, (of the raw material gas mixture in the central tube) is also controlled at the same time to less than 1, and in particular preferably between 0.7 and 0.9. The hydrogen ratio, gamma, is the ratio of hydrogen fed into the reactor plus hydrogen from the raw materials to the stoichiometrically required hydrogen. Lambda is the ratio of oxygen fed in to the stoichiometrically required oxygen.

A further feature of the invention also provides a pyrogenic metal oxide or metalloid oxide, preferably silicon dioxide, prepared by means of the process according to the invention, wherein during the preparation the hydrogen ratio, gamma, (of the raw material gas mixture in the central tube) is less than 1, and in particular preferably between 0.7 and 0.9, and the oxygen ratio, lambda, (of the raw material gas mixture in the central tube) at the same time is also less than 1, and in particular preferably between 0.7 and 0.9.

Yet another feature of the invention is a pyrogenic silicon dioxide prepared by means of the process according to the invention, which has a BET surface area of the silicon dioxide from 30 to 150 m²/g, and where a 19% aqueous suspension prepared from this pyrogenic oxide has a viscosity of less than 2,500 mpas, preferably of less than 1,000 mPas.

In a more detailed aspect, the invention also provides a pyrogenic silicon dioxide prepared by means of the process according to the invention, which has a BET surface area ranging from 30 to 150 m²/g and the fractal BET dimension, determined by $N_2$ adsorption in the pressure range $p/p_0 = 0.5$ to 0.8 according to the fractal BET theory for multi-layer adsorption by the method described by Pfeifer, Obert and Cole (Proc. R. Soc. London, A 423, 169 (1989)), is less than 2.605.

BRIEF DESCRIPTION OF THE DRAWINGS

The present invention will be further understood with reference to the accompanying drawings, wherein.

DETAILED DESCRIPTION OF THE INVENTION

Figure 1:
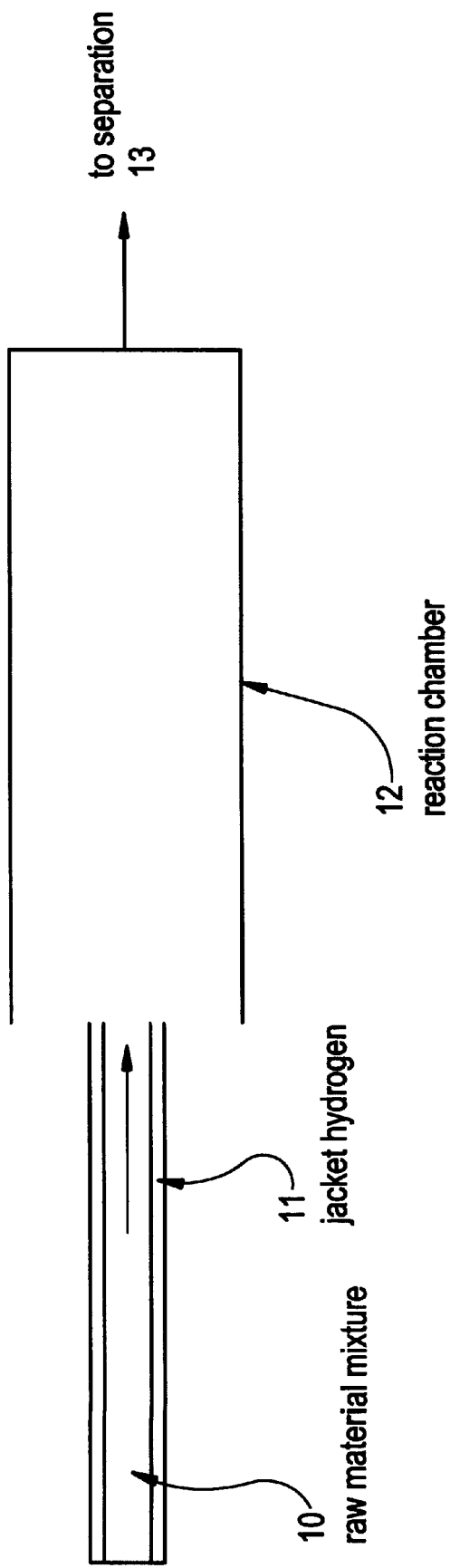
FIG. 1 is a schematic representation of the apparatus used for flame hydrolysis in accordance with this invention in the open mode.

Pyrogenic oxides are usually prepared by a method known in the art in which the gaseous starting substances are in a stoichiometric ratio to one another such that the hydrogen, which is either present in the raw materials or fed externally to the combustible gas mixture, is at least sufficient to react with the chlorine (from the silicon halide compounds) present in the combustible gas mixture to give HCl gas. The amount of hydrogen required for this is called the stoichiometric amount of hydrogen.

The ratio of hydrogen fed to the burner (external hydrogen plus chemically bonded hydrogen from the raw materials) to the amount of stoichiometrically required hydrogen just defined above is called gamma ($\gamma$). Accordingly:

| $\gamma$ | = | hydrogen fed to the burner / stoichiometrically required amount of hydrogen |
|---|---|---|
| or | | |
| gamma | = | $H_2$ fed in (mol)/ stoichiometric $H_2$ (mol) |

An amount of oxygen (for example from the air) which is at least sufficient to convert the silicon compounds into silicon dioxide and to convert any excess hydrogen still present into water is furthermore employed in the preparation of pyrogenic oxides.

This amount of oxygen is called the stoichiometric amount of oxygen.

Analogously, the ratio of oxygen fed to the burner to the amount of stoichiometrically required oxygen is called lambda ($\lambda$). Accordingly:

| $\lambda$ | = | oxygen fed to the burner / stoichiometrically required amount of oxygen |
|---|---|---|
| or | | |
| lambda | = | $O_2$ fed in (mol) / stoichiometric $O_2$ (mol) |

The following example is intended to illustrate the use of the terms gamma and lambda:

1 kg SiCl$_4$ is burned with 0.5 Nm$^3$ hydrogen and 3 Nm$^3$ air.

The basic reaction equation is:

$$SiCl_4 + 2\ H_2\ O_2 \rightarrow SiO_2 + 4\ HCl$$

2 moles of hydrogen and 1 mole of oxygen are therefore required per mole of SiCl$_4$.

If 1 kg SiCl$_4$ (5.88 mol) is reacted, the stoichiometric hydrogen requirement is then 2×5.88 mol=0.263 Nm$^3$ hydrogen.

If 1 kg SiCl$_4$ is burned with 0.5 Nm$^3$ hydrogen, the calculated value for gamma is 0.5/0.263=1.9.

The stoichiometric oxygen requirement is composed of two portions, and in particular on the one hand the portion (a) which is required to form the silicon dioxide, and a second portion (b) to convert excess hydrogen into water.

The stoichiometric oxygen requirement for the above example is thus calculated as follows:

Amount (a): formation of SiO$_2$ = 5.88 mol = 0.131 Nm$^3$ (O$_2$)
Amount (b): formation of water from the amount of hydrogen not reacted with SiCl$_4$ (in Nm$^3$: 0.5 − 0.263 = 0.237 Nm$^3$ unreacted hydrogen which, according to H$_2$ + 1/2 O$_2$ = H$_2$O, requires an amount of 0.237/2 = 0.118 Nm$^3$ oxygen.)

Stoichiometric oxygen requirement=amount (a) plus amount (b) =0.131+0.118=0.249 Nm$^3$ (O$_2$)

If 3 Nm$^3$ air (with an oxygen content of 21.0 vol. % O$_2$, correspondingly=0.63 Nm$^3$ oxygen) is employed, the parameter lambda is calculated as follows:

lambda=0.63/(0.131+0.118)=2.53

For raw materials which already contain hydrogen in the molecule, such as e.g. trichlorosilane, the hydrogen contained in the molecule is counted in the calculation as hydrogen additionally fed in.

For molecules which contain carbon in the molecule, when calculating the stoichiometric oxygen requirement it must be taken into account that this carbon must react completely to give CO$_2$.

A distinction is made between the open and closed mode of operation of the apparatus used for the flame hydrolysis for the preparation of pyrogenic oxides.

In FIG. 1, there is shown, schematically, an apparatus for carrying out the open mode of operation. The reaction mixture composed of the raw mixture in the central tube 10 and the hydrogen in a jacketed tube 11 burns in a reaction chamber 12 which is open to the atmosphere and in which a reduced pressure prevails, ambient air also being sucked in to the reaction chamber.

The gaseous mixture of raw materials is premixed homogeneously in a burner of known design and burns in the reaction chamber 12. To avoid caking, a second annular outflow nozzle 11, out of which (jacket) hydrogen flows, is placed around the annular outflow nozzle 10 out of which the raw material mixture flows. The product stream exits at 13 for separation by conventional means.

For purposes of definition, in the subsequent considerations and in the calculation of the flame parameters, only the mass streams which are premixed in the central tube are taken into consideration. This means, for example, that the expression "less than stoichiometric" relates only to the ratios in the central tube 10 and not to those in the reaction chamber 12.

Figure 2:
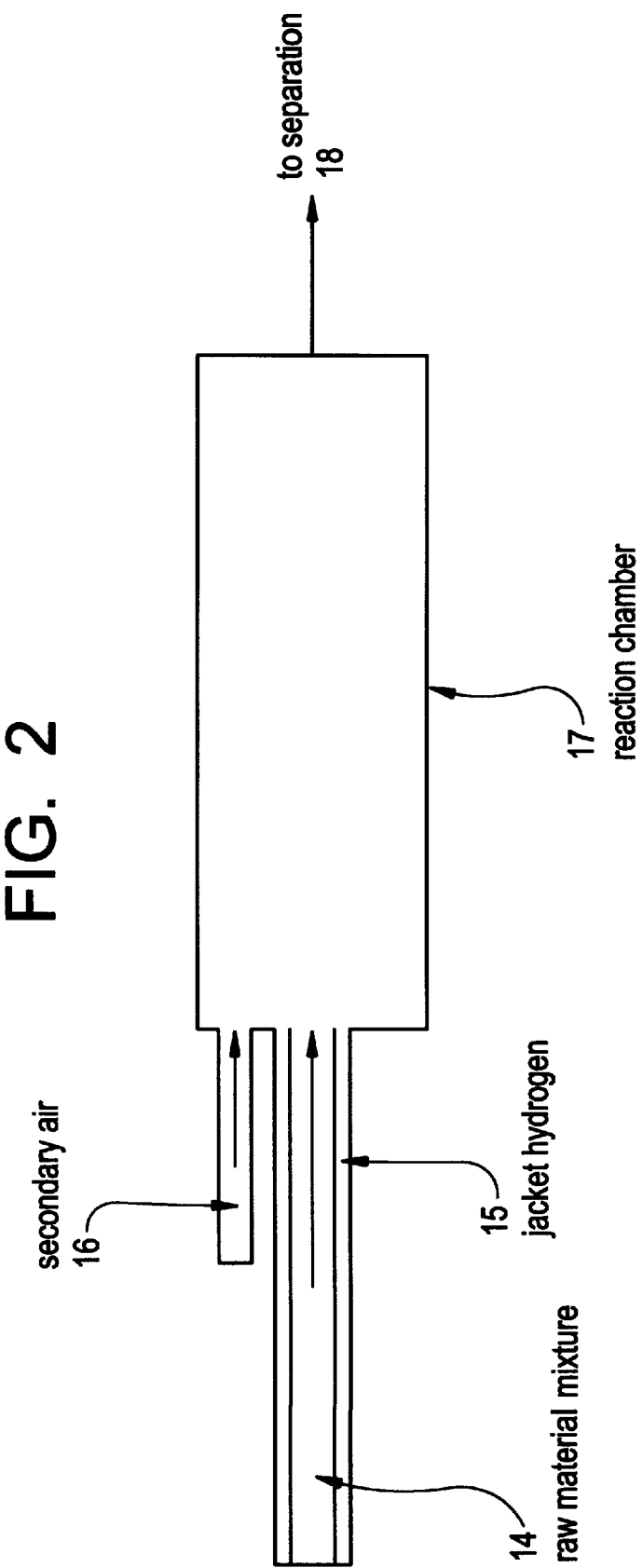
FIG. 2 is a schematic representation of the apparatus used for flame hydrolysis in accordance with this invention in the closed mode.

FIG. 2 is a schematic representation of the apparatus used in the closed mode of operation. The reaction mixture component of the raw material flowing in the central pipe 14 and the hydrogen introduced in the outer jacket tube 15 burns in a reaction chamber 17 which is closed off from the atmosphere. In this mode of operation, as a rule an accurately measured amount of secondary air is added in a pipe 16 in order to avoid the formation of explosive mixtures. The product stream exits at 18 for separation and recovery.

For normal operation of the reactors for the preparation of pyrogenic oxides, both in the open and in the closed mode of operation, gamma values of greater than 1 (to avoid formation of chlorine) and lambda values of greater than 1 (to avoid explosive mixtures) are aimed for.

If an aqueous dispersion is prepared from the pyrogenic oxides, it is found, according to the invention, that during CMP use of these dispersions, the rates of removal of material achieved (for the same specific surface area of the pyrogenic silicon dioxide employed) depend critically on the parameters of gamma and lambda during preparation of the pyrogenic oxide.

Figure 3:
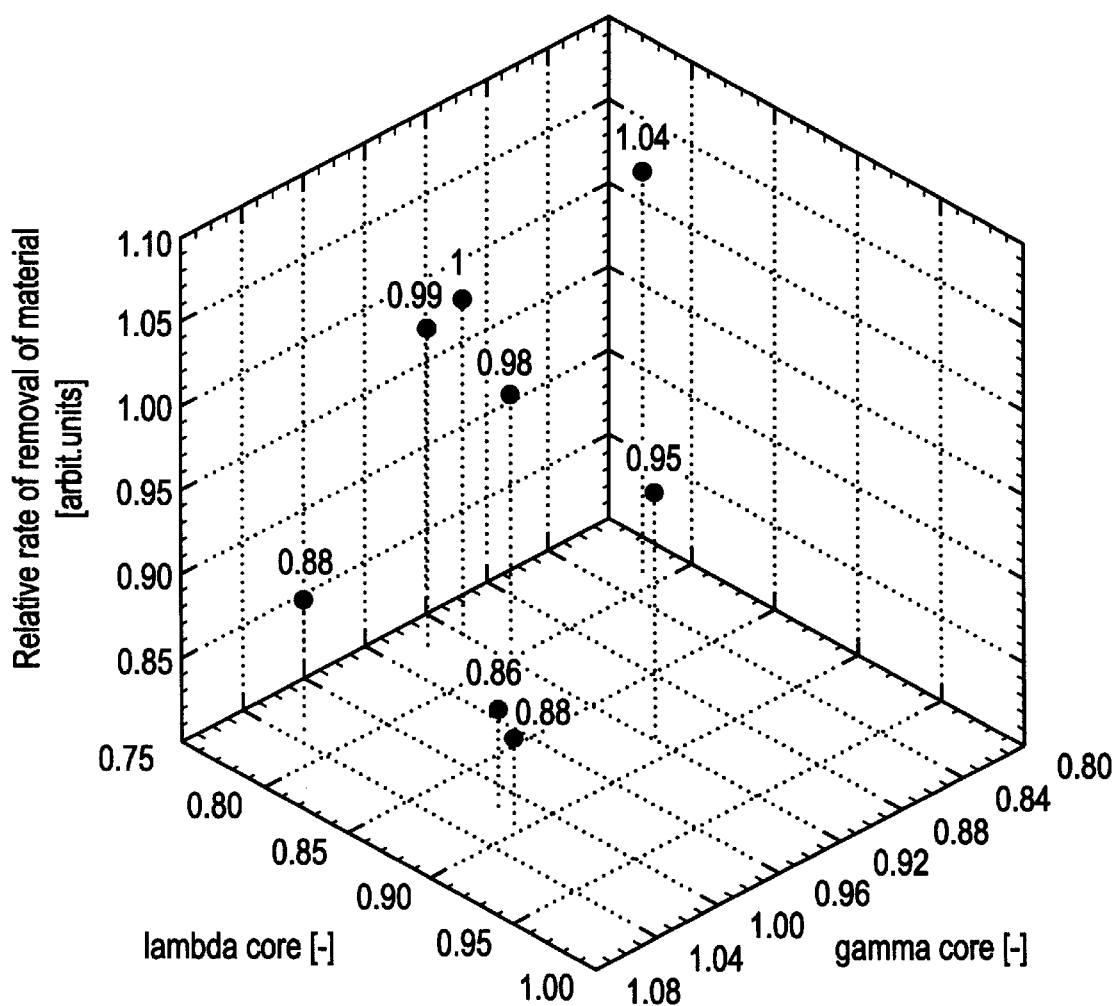
FIG. 3 is a 3-dimensional plot of relative removal rate versus lambda and gamma.

In particular, an increased rate of removal of material by polishing is found if both gamma values of less than 1 and lambda values of less than 1 are established during preparation of the pyrogenic oxide. This is shown in FIG. 3 which is a 3-dimensional plot of relative rate of removal of material in the polishing operation versus lambda and gamma. The plot shows higher rates when lambda and gamma are both less than one.

The oxides prepared according to the invention show a significantly increased rate of removal of material during CMP use compared with known oxides having the same specific surface area, without a deterioration in the surface roughness.

This is explained in more detail with the aid of the following examples.

All the following examples were carried out by the open mode of operation using the apparatus as schematically illustrated in FIG. 1. The terms "silicic acid", "silica" and "silicon oxide" can be used interchangeably herein.

Methods for Determination of the Polishing Rate and the Preparation of the 12% Dispersion The polishing rate is determined with a dispersion which is 12% with respect to the pyrogenic oxides. The preparation of the dispersions and the method for precise determination of the rate of removal of material are described in WO 95/06690, page 6 in example 1a which is incorporated wherein by reference. The polishing rate of the 12% dispersion which was prepared from the pyrogenic silica of example 3 is defined as the standard and set equal to one (1).

Since the polishing rate is only determined a fairly long time after the preparation of the pyrogenic silicic acid, a 19% aqueous dispersion is prepared for rapid characterization of the pyrogenic silicic acid. This 19% dispersion is used for monitoring the manufacturing plant and for characterizing the silicic acid.

The 19% dispersion is prepared as follows: 38 g pyrogenic oxide and 162 g deionized water are stirred with a dissolver at 2,500 rpm for 5 minutes. The viscosity is measured with a Brookfield viscometer DV 2 at 5 rpm (spindle size 2). The value is determined after one minute.

Example 1: (low rate of removal of material)

2,000 kg/h of a raw material mixture which comprises 84 wt. % silicon tetrachloride and 16 wt. % trichlorosilane are vaporized and the vapor is mixed in a burner of known design with 1,325 Nm³/h air and with 360 Nm³/h of a gas mixture A which comprises 94 vol. % hydrogen and 6 vol. % trichlorosilane and with 177 Nm³/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the well known BET method. This is 85 m²/g.

The flame parameters of the raw materials mixed in the central tube are calculated. The flame parameter gamma is calculated as 1.02 and the parameter lambda is calculated as 0.90.

A 12% aqueous dispersion is prepared from the silicic acid thus prepared and a polishing experiment for polishing silicon dioxide layers is carried out with this.

The relative rate of abrasion of the dispersion during polishing is 0.86.

Example 2: (low rate of removal of material)

2,000 kg/h of a raw material mixture which comprises 84 wt. % silicon tetrachloride and 16 wt. % trichlorosilane are vaporized and the vapor is mixed in a burner of known design with 1,285 Nm³/h air and with 385 Nm³/h of a gas mixture A which comprises 94 vol. % hydrogen and 6 vol. % trichlorosilane, and with 180 Nm³/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 85 m²/g.

The flame parameters of the raw materials mixed in the central tube are calculated. The flame parameter gamma is calculated as 1.01 and the parameter lambda is calculated as 0.88.

A 12% aqueous dispersion is prepared from the silicic acid thus prepared and a polishing experiment for polishing silicon dioxide layers is carried out with this.

The relative rate of abrasion of the dispersion during polishing is 0.86.

Example 3: (good rate of removal of material)

2,000 kg/h of a raw material mixture which comprises 96 wt. % silicon tetrachloride and 4 wt. % trichlorosilane are vaporized and the vapor is mixed in a burner of known design with 1,100 Nm³/h air and with 281 Nm³/h of a gas mixture A which comprises 94 vol. % hydrogen and 6 vol. % trichlorosilane, and with 229 Nm³/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 82 m²/g.

The flame parameters of the raw materials mixed in the central tube are calculated. The flame parameter gamma is calculated as 0.92 and the parameter lambda is calculated as 0.77.

A 12% aqueous dispersion is prepared from the silicic acid thus prepared and a polishing experiment for polishing silicon dioxide layers is carried out with this.

The relative rate of abrasion of the dispersion during polishing is 1.

Example 4: (good rate of removal of material)

2,000 kg/h of a raw material mixture which comprises silicon 96 wt. % tetrachloride and 4 wt. % trichlorosilane are vaporized and the vapor is mixed in a burner of known design with 1,100 Nm³/h air and with 260 Nm³/h of a gas mixture A which comprises 94 vol. % hydrogen and 6 vol. % trichlorosilane, and with 260 Nm³/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 81 m²/g.

The flame parameters of the raw materials mixed in the central tube are calculated. The flame parameter gamma is calculated as 0.94 and the parameter lambda is calculated as 0.77.

A 12% aqueous dispersion is prepared from the silicic acid thus prepared and a polishing experiment for polishing silicon dioxide layers is carried out with this.

The relative rate of abrasion of the dispersion during polishing is 0.99.

Example 5: (good rate of removal of material)

2,000 kg/h of a raw material mixture which comprises silicon 96 wt. % tetrachloride and 4 wt. % trichlorosilane are vaporized and the vapor is mixed in a burner of known design with 1,175 Nm³/h air and with 260 Nm³/h of a gas mixture A which comprises 94 vol. % hydrogen and 6 vol. % trichlorosilane, and with 260 Nm³/h of a gas mixture B which comprises 90.4 vol. % hydrogen, 5.6 vol.% nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 90 m²/g.

The flame parameters of the raw materials mixed in the central tube are calculated. The flame parameter gamma is calculated as 0.94 and the parameter lambda is calculated as 0.82.

A 12% aqueous dispersion is prepared from the silicic acid thus prepared and a polishing experiment for polishing silicon dioxide layers is carried out with this.

The relative rate of abrasion of the dispersion during polishing is 0.98.

Example 6: (good rate of removal of material)

1,900 kg/h of a raw material mixture which comprises 84 wt. % silicon tetrachloride and 16 wt. % trichlorosilane are vaporized together with 100 kg/h propyltrichlorosilane and the vapor is mixed in a burner of known design with 1,400 Nm³/h air and with 330 Nm³/h of a gas mixture A which comprises 94 vol. % hydrogen and 6 vol. % trichlorosilane, and with 150 Nm³/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 86 m²/g.

The flame parameters of the raw materials mixed in the central tube are calculated. The flame parameter gamma is calculated as 0.92 and the parameter lambda is calculated as 0.89.

A 12% aqueous dispersion is prepared from the silicic acid thus prepared and a polishing experiment for polishing silicon dioxide layers is carried out with this.

The relative rate of abrasion of the dispersion during polishing is 0.95.

Example 7: (low rate of removal of material)

2,000 kg/h of a raw material mixture which comprises 96 wt. % silicon tetrachloride and 4 wt. % trichlorosilane are vaporized and the vapor is mixed in a burner of known design with 1,125 Nm$^3$/h air and with 350 Nm$^3$/h of a gas mixture A which comprises 94 vol. % hydrogen and 6 vol. % trichlorosilane, and with 250 Nm$^3$/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 84 m$^2$/g.

The flame parameters of the raw materials mixed in the central tube are calculated. The flame parameter gamma is calculated as 1.03 and the parameter lambda is calculated as 0.78.

A 12% aqueous dispersion is prepared from the silicic acid thus prepared and a polishing experiment for polishing silicon dioxide layers is carried out with this.

The relative rate of abrasion of the dispersion during polishing is 0.88.

Example 8: (high rate of removal of material)

2,000 kg/h of a raw material mixture which comprises 84 wt. % silicon tetrachloride and 16 wt. % trichlorosilane are vaporized and the vapor is mixed in a burner of known design with 1,125 Nm$^3$/h air and with 320 Nm$^3$/h of a gas mixture A which comprises 94 vol. % hydrogen and 6 vol. % trichlorosilane, and with 125 Nm$^3$/h of a gas mixture B which comprises 90.4 vol. % hydrogen, 5.6 vol. % nitrogen, 0.6 vol. % carbon monoxide and 3.4 vol. % methane. The gas mixture is ignited, the pyrogenic silicic acid formed is separated off from the gases and, after treatment with water vapor (for deacidification), the specific surface area is determined by the BET method. This is 85 m$^2$/g.

The flame parameters of the raw materials mixed in the central tube are calculated. The flame parameter gamma is calculated as 0.82 and the parameter lambda is calculated as 0.79.

A 12% aqueous dispersion is prepared from the silicic acid thus prepared and a polishing experiment for polishing silicon dioxide layers is carried out with this.

The relative rate of abrasion of the dispersion during polishing is 1.04.

The reference data of the experiments described are summarized in Table 1.

The dependence of the relative rate of removal of material during polishing is plotted as a function of the flame parameters gamma and lambda in FIG. 3.

It can be seen that the highest rates of removal of material by the dispersion are found when the flame parameters during preparation of the pyrogenic oxides are significantly under the value 1, and preferably between 0.9 and 0.7.

The different rate of removal of material also manifests itself in the different viscosity of aqueous suspensions which have been prepared from the pyrogenic oxides.

From Table 1 it follows that an inverse relationship exists between the viscosity of the aqueous suspension and the rate of removal of material.

The pyrogenic silicic acids prepared by the process according to the invention have a reduced fractal dimension compared with the pyrogenic silicic acids prepared by the known process. The reduced fractal dimension is accompanied by an increased rate of removal of material.

The fractal dimension was determined by N$_2$ adsorption in the pressure range p/p$_0$=0.5 to 0.8. The measurements results were evaluated according to the fractal BET theory for multi-layer adsorption by the method of Pfeifer, Obert and Cole. (Proc. R. Soc. London, A 423, 169 (1989)) which is relied on and incorporated herein by reference.

Figure 4:
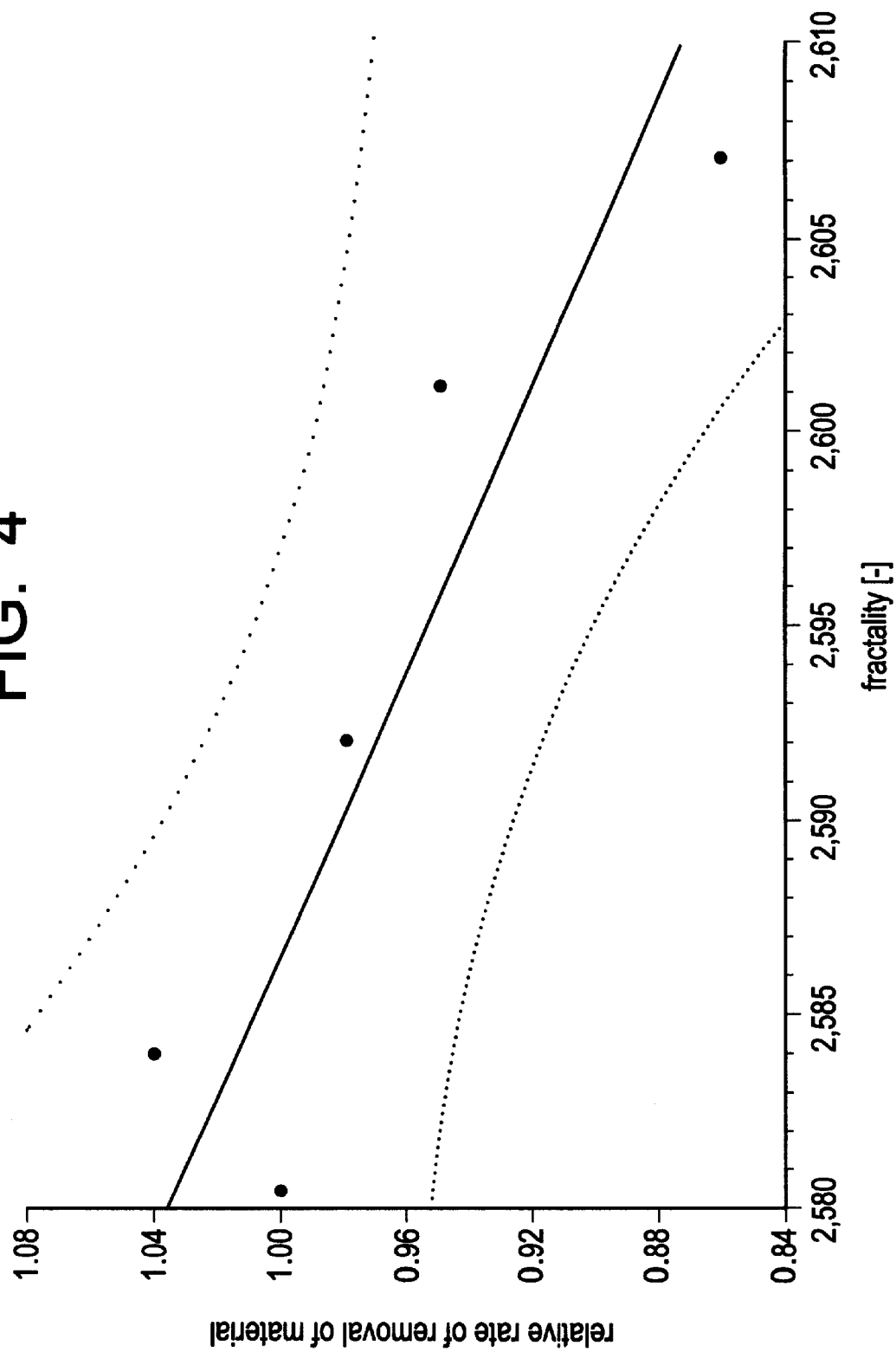
FIG. 4 is a graph of relative removal rate versus fractality.

The dependence of the rate of removal of material on the fractality found is plotted in FIG. 4. In addition to the regression line, a 95% confidence curve is additionally shown.

Further variations and modifications will be apparent to those skilled in the art from the foregoing and are intended to be encompassed by the claims appended hereto.

German priority application 197 02 230.8 is relied on and incorporated herein by reference.

TABLE 1

| Example No. | Raw Material flow rate [kg/h] | PTS [kg/h] | Air Core [Nm$^3$/h] | Mixture A [Nm$^3$/h] | Mixture B [Nm$^3$/h] | Gamma Core [—] | Lambda Core [—] | Rate of Removal of Material [arbit. units] | BET [m$^2$/g] | Visc. 19% [mPas] | Fractal Dimension |
|---|---|---|---|---|---|---|---|---|---|---|---|
| 1 | 2,000/R1 | 0 | 1,325 | 360 | 177 | 1.02 | 0.9 | 0.86 | 85 | | 2,607 |
| 2 | 2,000/R1 | 0 | 1,285 | 385 | 180 | 1.01 | 0.88 | 0.86 | 85 | | |
| 3 | 2,000/R2 | 0 | 1,100 | 281 | 229 | 0.92 | 0.77 | 1 | 82 | 400 | 2,581 |
| 4 | 2,000/R2 | 0 | 1,100 | 260 | 260 | 0.94 | 0.77 | 0.99 | 81 | | |
| 5 | 2,000/R2 | 0 | 1,175 | 260 | 260 | 0.94 | 0.82 | 0.98 | 90 | | 2,592 |
| 6 | 2,000/R1 | 100 | 1,400 | 330 | 150 | 0.92 | 0.89 | 0.95 | 86 | 1,058 | 2,601 |
| 7 | 2,000/R2 | 0 | 1,125 | 350 | 250 | 1.03 | 0.78 | 0.88 | 84 | | |
| 8 | 2,000/R1 | 0 | 1,125 | 320 | 125 | 0.82 | 0.79 | 1.04 | 85 | 52 | 2,584 |

R1 = raw material 1 = 16 wt. % trichlorosilane, 84 wt. % silicon tetrachloride
R2 = raw material 2 = 4 wt. % trichlorosilane, 96 wt. % silicon tetrachloride
PTS = propyltrichlorosilane
Mixture A = see text
Mixture B = see text
Gamma core: hydrogen ratio in the central tube
Lambda core: oxygen ratio in the central tube
Rate of removal of material relative to example 3 (by definition = 1)

We claim:

1. A process for the preparation of pyrogenic oxides comprising subjecting a metal or metalloid halide compound raw material to high-temperature flame hydrolysis reaction in the presence of sufficient oxygen and hydrogen, controlling the hydrogen ratio gamma for the preparation of the pyrogenic oxide to less than 1, and controlling the oxygen ratio lambda at the same time to less than 1, gamma being the ratio of hydrogen fed into the reaction plus hydrogen from the raw materials to the stoichiometrically required hydrogen and lambda being the ratio of oxygen fed in to the stoichiometrically required oxygen.

2. The process according to claim 1 wherein said raw material, oxygen and hydrogen are premixed in a central mixing zone before reacting in a reacting zone.

3. The process according to claim 1 wherein gamma is 0.7 to 0.9.

4. The process according to claim 1 wherein lambda is 0.7 to 0.9.

5. The process according to claim 1 wherein a silicon halide or organosilicon halide is the raw material.

6. The process according to claim 1 wherein the silicon halide is silicon tetrachloride.

7. The process according to claim 1 wherein trichlorosilane is used.

* * * * *